US012647311B2

(12) United States Patent
Beracha et al.

(10) Patent No.: US 12,647,311 B2
(45) Date of Patent: Jun. 2, 2026

(54) TRANSFERRING CONGESTION NOTIFICATIONS

(71) Applicant: MELLANOX TECHNOLOGIES, LTD., Yokneam (IL)

(72) Inventors: Eran Gil Beracha, Tel Aviv (IL); Gil Mey-Tal, Tel Aviv (IL); Tal Mund, Herzliya (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 1 day.

(21) Appl. No.: 18/796,767

(22) Filed: Aug. 7, 2024

(65) Prior Publication Data

US 2026/0046191 A1 Feb. 12, 2026

(51) Int. Cl.
| *H04L 41/06* | (2022.01) |
| *H04L 47/11* | (2022.01) |
| *H04L 47/125* | (2022.01) |

(52) U.S. Cl.
CPC .............. *H04L 41/06* (2013.01); *H04L 47/11* (2013.01); *H04L 47/125* (2013.01)

(58) Field of Classification Search
CPC ......... H04L 41/06; H04L 47/11; H04L 47/125
See application file for complete search history.

(56) References Cited

U.S. PATENT DOCUMENTS

| 6,208,619 B1 * | 3/2001 | Takeuchi | ................ H04L 47/10 |
| | | | 370/468 |
| 9,584,418 B2 * | 2/2017 | Iles | ......................... H04L 47/12 |

| 10,122,639 B2 * | 11/2018 | Toy | ........................ H04L 47/283 |
| 10,282,338 B1 * | 5/2019 | Bao | ....................... G06F 13/4265 |
| 10,698,718 B2 * | 6/2020 | Rong | ................... H04L 47/263 |
| 12,273,270 B2 * | 4/2025 | Lee | ......................... H04L 47/115 |
| 2008/0298248 A1 * | 12/2008 | Roeck | ................... H04L 49/505 |
| | | | 370/237 |
| 2009/0086637 A1 * | 4/2009 | DeCusatis | ............... H04L 47/10 |
| | | | 370/236.1 |
| 2011/0261697 A1 * | 10/2011 | Crisan | ................... H04L 47/127 |
| | | | 370/235 |
| 2013/0124753 A1 * | 5/2013 | Ansari | ..................... H04L 47/30 |
| | | | 709/235 |
| 2014/0269325 A1 * | 9/2014 | Chrysos | ................ H04L 49/506 |
| | | | 370/237 |
| 2014/0269378 A1 * | 9/2014 | Holbrook | ................ H04L 47/30 |
| | | | 370/252 |
| 2015/0117195 A1 * | 4/2015 | Toy | ......................... H04L 47/11 |
| | | | 370/232 |
| 2020/0028786 A1 * | 1/2020 | Chachmon | .............. H04L 45/22 |
| 2020/0236052 A1 * | 7/2020 | Srinivasan | .............. H04L 45/28 |
| 2022/0210075 A1 * | 6/2022 | Musleh | ................... H04L 47/30 |

* cited by examiner

*Primary Examiner* — Javier O Guzman
(74) *Attorney, Agent, or Firm* — Sheridan Ross P.C.

(57) ABSTRACT

Systems, devices, and methods are provided. In one example, a system is described that includes circuits to receive a packet associated with a source, determine a device that received the packet is congested, in response to determining the switch that received the packet is congested, generate a congestion notification, transfer the congestion notification to a second device, wherein the second device is between the device and the source, set a timer, and in response to the congestion in the device not being resolved when the timer ends, generate and send a new congestion notification.

20 Claims, 4 Drawing Sheets

TRANSFERRING CONGESTION NOTIFICATIONS

FIELD OF THE DISCLOSURE

The present disclosure is generally directed toward networking and, in particular, toward networking devices and methods of operating the same.

BACKGROUND

Switches and similar network devices represent a core component of many communication, security, and computing networks. Switches are often used to connect multiple devices to form networks.

Devices including but not limited to personal computers, servers, and other types of computing devices, may be interconnected using network devices such as switches. Such interconnected entities may form a network enabling data communication and resource sharing among the nodes. Often multiple potential paths for data flow may exist between any pair of devices. This feature allows data to traverse different routes from a source device to a destination device. Such a network design enhances the robustness and flexibility of data communication as it provides alternatives in case of path failure, congestion, or other adverse conditions. Moreover, such a network design facilitates load balancing across the network, optimizing the overall network performance and efficiency.

BRIEF SUMMARY

In accordance with one or more embodiments described herein, a computing system, such as a switch, may enable a diverse range of systems, such as switches, servers, personal computers, and other computing devices, to communicate across a network. Ports of the computing system may function as communication endpoints, allowing the computing system to manage multiple simultaneous network connections with one or more nodes. The computing system, which may be referred to herein as a switch or other networking device, may perform one or more methods involving the generation and sending and/or the receipt and handling of congestion notifications (e.g., adaptive routing notification (ARN) packets, data packets, etc.). Such congestion notifications, as described herein, may be used to reduce congestion throughout a network as well as to avoid issues caused by such congestion.

The present disclosure describes systems, devices, and methods for enabling a switch or other computing system to generate congestion notifications based on congestion in a network and to route packets based on received congestion notifications in such a way as to solve the above-noted shortcomings associated with congestion in the network. As an illustrative example aspect of the systems and methods disclosed, a system may include one or more circuits to receive a packet associated with a source, determine a device that received the packet is congested, in response to determining the device that received the packet is congested, generate a congestion notification, transfer the congestion notification to a second device, wherein the second device is between the device and the source, set a timer, and in response to the congestion in the device not being resolved when the timer ends, generate and send a new congestion notification.

The above example aspect includes wherein the one or more circuits are further to process the congestion notification and re-route network traffic based on the congestion notification, and generate and transfer a second congestion notification to a third device, wherein the third device is between the second device and the source.

The above example aspect includes wherein the one or more circuits are further to process the second congestion notification and re-route network traffic based on the second congestion notification, generate a third congestion notification, and transfer the third congestion notification to a fourth device, wherein the fourth device is between the third device and the source, but when the third device is directly connected to the source, the third congestion notification is not generated or transferred.

The above example aspect includes wherein the one or more circuits are further to: generate the congestion notification in response to determining at least one port in the device and an associated bandwidth is below a threshold, wherein the congestion in the device is determined based on one or more of a queue latency and a queue occupancy, wherein re-routing the network traffic comprises using adaptive routing to re-route the network traffic, and wherein the congestion notification comprises an Adaptive Routing Notification (ARN).

In another illustrative example, a device includes one or more circuits to receive a packet associated with a source, determine the device that received the packet is congested, in response to determining the device that received the packet being congested, generate a congestion notification, transfer the congestion notification to a second device, wherein the second device is between the device and the source, set a timer, and in response to the congestion in the device not being resolved when the timer ends, generate and send a new congestion notification.

In yet another illustrative example, a network includes a first device to receive a congestion notification from a second device, wherein the congestion notification is addressed to a source node, and wherein the first device is between the second device and the source node, process the congestion notification and re-route network traffic based on the congestion notification, generate a second congestion notification, and transfer the second congestion notification to a third device, wherein the second congestion notification is addressed to the source node, and wherein the third device is between the first device and the source node.

The routing approaches depicted and described herein may be applied to a device, a processor, a Central Processing Unit (CPU), a Field Programmable Gate Array (FPGA), a switch, a router, or any other suitable type of networking device known or yet to be developed. Additional features and advantages are described herein and will be apparent from the following description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
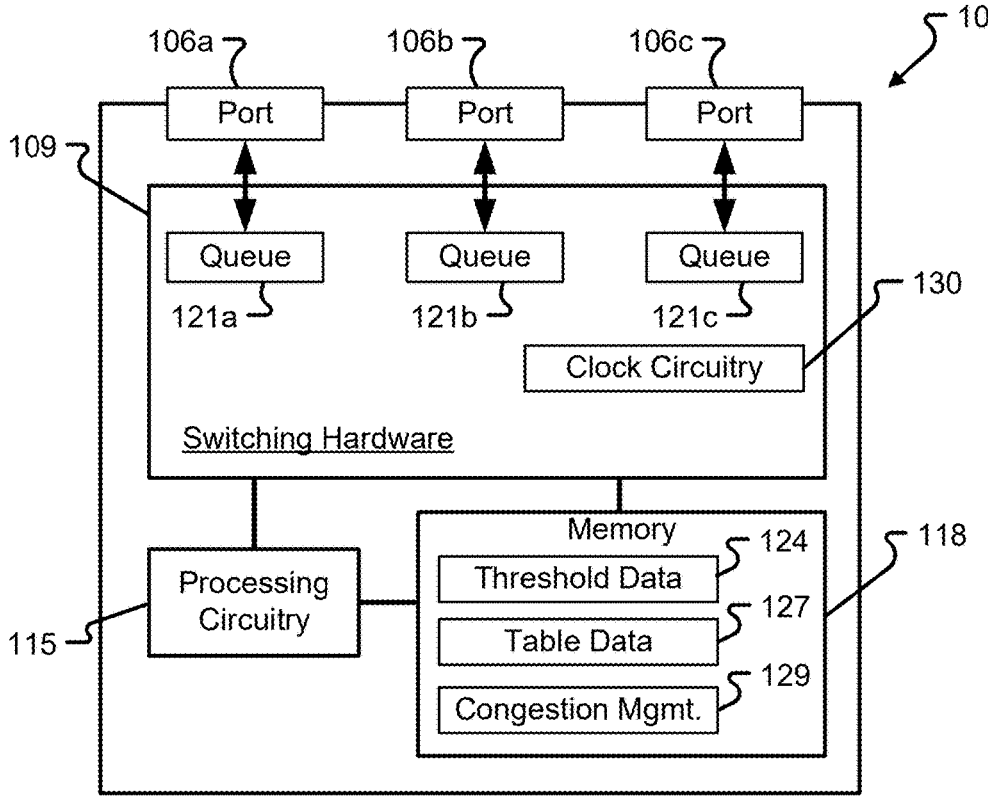
FIG. 1 is a block diagram depicting an illustrative configuration of a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It is understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," "compute," and variations thereof, as used herein, are used interchangeably, and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Explicit congestion notification (ECN) is a feedback scheme that indicates congestion information by marking packets instead of dropping them. The destination of marked packets returns this congestion notification to the source. As a result, the source decreases its transmit rate.

Large-scale supercomputing and AI data centers utilize multipath, such as adaptive routing, to implement load balancing and improve link reliability. Adaptive Routing enables the switch to select the output port based on the port's load. Adaptive routing can dynamically adjust routing policies based on path congestion and failures. When congestion or failure occurs, in addition for the local node to apply adaptive routing, the congestion/failure information also needs to be sent to other nodes in a timely and accurate manner, so as to enforce adaptive routing in other nodes to avoid exacerbating congestion on the path.

In adaptive routing there are multiple but non-equivalent paths between a source and a destination. In most cases, the shortest path is preferred to be selected for forwarding traffic. However, traffic congestion or link failures may occur on the shortest path. To this end, adaptive routing is widely used for nodes to make dynamic routing decisions based on dynamics of network topology (e.g., link failure) as well as variations of traffic (e.g., link congestion). When congestion occurs on the shortest path, the local node that detects it applies adaptive routing immediately and, at the same time, explicitly advertises congestion signals to other remote nodes. In this way, the network selects another non-congested path to forward packets temporarily until congestion elimination signal is received. Adaptive routing enables the network to mitigate traffic collisions and make use of idle links to improve bandwidth utilization.

A congestion notification should be sent to the node in the network that can eliminate the congestion by routing the traffic on a different route. One method of notifying the relevant node is to propagate the information using the method described herein. Given a big cluster of switches and GPUs, the current methods of determining which node in the network can eliminate the congestion (e.g., based on orchestration tools that map each switch's location in the network, or software that allows each switch to determine the exact location of all other switches in the network) are not scalable and expensive.

When there is congestion, it is certain that the relevant switch that can resolve the congestion is located somewhere between the node that generated the packet, and the switch that generated the congestion notification. Using this information, the relevant device (e.g., the relevant switch) can be notified without having to know the exact location of the relevant device.

The method of propagating congestion notifications through the network of the present disclosure is implemented the following way: switch A identifies congestion and generates a congestion notification. The packet header of the congestion notification includes the IP address of the host that sent the original packet as the destination IP. In this example, switch A is connected to switches B0 and B1, switch A routes the ARN packet towards the host, choosing either switch B0 or switch B1 (or any other spine switch that is connected to it). Each switch that receives a congestion notification, consumes the congestion notification, which triggers adaptive routing (e.g., re-routing traffic) and the generation of a new congestion notification that is sent to another switch between the switch that received the first congestion notification and the host that sent the original packet.

Continuing the example, consider that the relevant switch that can resolve the congestion in switch A is switch D, also consider that the switch B0, but not the switch B1 reaches switch D. If the congestion notification from the switch A goes to the switch B1, then the congestion caused by D will not be resolved as the congestion notification never reaches the switch D via the switch B1. The switch A may set a timer when it sends the first congestion notification, and at the end of the timer, the switch A checks to see if the congestion has been resolved. In this case, as the switch D never receives the congestion notification via the switch B1, the congestion will not be resolved at the end of the time, and therefore, the switch A will send another congestion notification, until a congestion notification is received at the switch D, which can resolve the congestion. In other words, the switch A may resolve the congestion without knowing the location of the relevant switch (e.g., the switch D).

Referring now to FIGS. 1-6, various systems and methods for routing packets between switches and nodes will be described. The concepts of packet routing depicted and described herein can be applied to the routing of information from one computing device to another. The term packet as used herein should be construed to mean any suitable discrete amount of digitized information. The data being routed may be in the form of a single packet or multiple packets without departing from the scope of the present disclosure. Furthermore, certain embodiments will be described in connection with a system that is configured to make centralized routing decisions whereas other embodiments will be described in connection with a system that is configured to make distributed and possibly uncoordinated routing decisions. It should be appreciated that the features and functions of a centralized architecture may be applied or used in a distributed architecture or vice versa.

Figure 2:
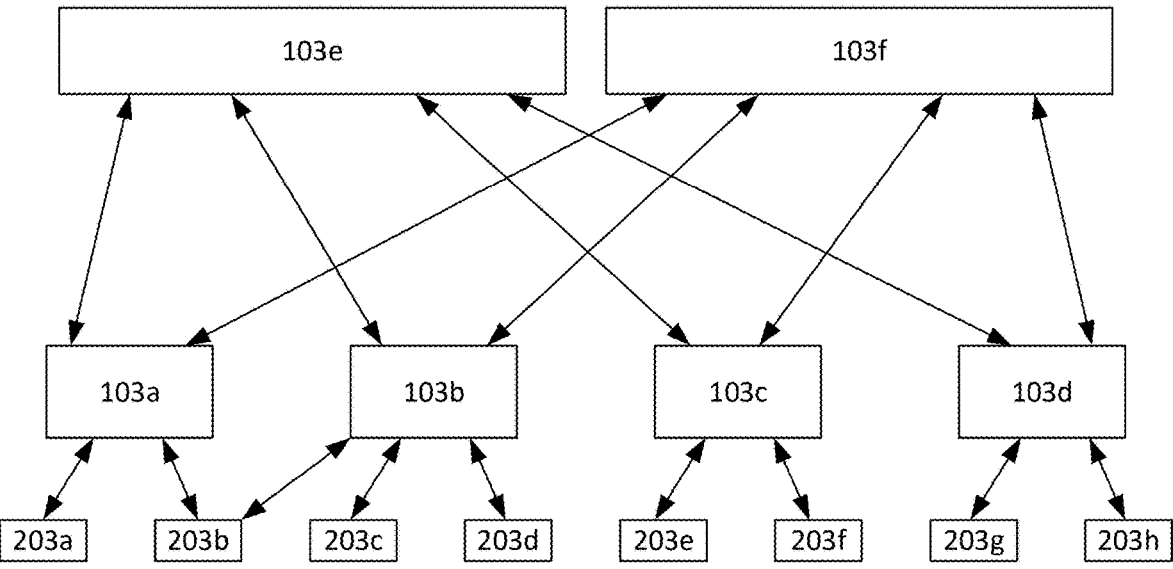
FIG. 2 illustrates a network of computing systems and nodes in accordance with at least some embodiments of the present disclosure.

As illustrated in FIG. 1, a switch 103 as described herein may be a computing system comprising a number of ports 106a-c which may be used to interconnect with other switches 103 and/or computing systems and network devices, which may be referred to as nodes, to make up a network. For example, and as illustrated in FIG. 2, a switch 103 may be a spine switch 103e, 103f and/or a leaf switch 103a-d and may connect to other switches 103 and/or nodes 203a-h. Such a network of switches 103 and nodes 203 may be useful in various settings, from data centers and cloud computing infrastructures to artificial intelligence systems.

Switches 103, as described in greater detail herein, may enable communication between switches 103 and/or nodes 203. A switch 103 may be, for example, a switch, a network interface controller (NIC), or other device capable of receiving and sending data, and may act as a central node in the network. Switches 103 may be wired in a topology including spine switches, top-of-rack (TOR) switches, and/or leaf switches, for example. Switches 103 may be capable of receiving, processing, and forwarding data, e.g., packets, to appropriate destinations within the network, such as other switches 103 and/or nodes 203. In some implementations, a switch 103 may be included in a switch box, a platform, or a case which may contain one or more switches 103 as well as one or more power supply devices and other components.

In some implementations, a switch 103 may comprise one or more ports 106a-c connected to one or more ports of other switches 103 and/or nodes 203. Processes, such as applications executed by nodes 203 may involve transmitting data to other nodes 203 of the network via switches 103. Data may flow through the network of switches 103 and nodes 203 using one or more protocols such as transmission control protocol (TCP), user datagram protocol (UDP), or Internet protocol (IP), for example. Each switch 103 may, upon receiving data from a node 203 or another switch 103 examine the data to identify a destination for the data and route the data through the network.

Data may be routed through the network in routes chosen at least in part based on table data 127 stored in memory 118 of each switch 103 which handles the data. For example, and as described in greater detail herein, a switch 103 may implement an adaptive routing mechanism in which the switch 103 chooses a particular port 106a-c from which to forward a particular packet based on state data in a table. Such state data may indicate an amount of bandwidth, such as in terms of percentage and/or a data rate, for any possible route a packet may take to reach its destination.

Each node 203 may be a computing unit, such as a personal computer, server, or other computing device, and may be responsible for executing applications and performing data processing tasks. Nodes 203 as described herein may range from servers in a data center to desktop computers in a network, or to devices such as internet of things (IoT) sensors and smart devices as examples.

Each node 203 may for example include one or more processing circuits, such as graphics processing units (GPUs), central processing units (CPUs), application-specific integrated circuits (ASICs), field programmable gate arrays (FPGAs), or other circuitry capable of performing computations, as well as memory and storage resources to run software applications, handle data processing, and perform specific tasks as required. In some implementations, nodes 203 may also or alternatively include hardware such as GPUs for handling intensive tasks for machine learning, artificial intelligence (AI) workloads, or other complex processes.

For example, nodes 203 communicating via switches 103 may operate as a high-performance computing (HPC) cluster. A cluster of nodes 203 may comprise numerous interconnected servers, each equipped with CPUs and/or GPUs. The nodes 203 may provide computational horsepower for, as an example, training large-scale AI models or running complex scientific simulations. For AI and machine learning tasks, the nodes 203 may comprise one or more GPUs or other processing circuitry which may be capable of handling parallel processing requirements of neural networks and other applications.

Nodes 203 may be client devices which, for example, engage in AI-related, research-related, and other processor-intensive tasks, and utilize a network of switches 103 and other nodes 203 to handle the computational loads and data throughput required by such intensive applications. Such nodes 203 may include, for example, workstations and personal computers used by researchers, data scientists, and professionals for developing, testing, and running AI models and research simulations.

A switch 103 as described herein may in some implementations be as illustrated in FIG. 1. Such a switch 103 may include a plurality of ports 106a-c, queues 121a-c, switching hardware 109, processing circuitry 115, and memory 118. The ports 106a-c of a switch 103 may be capable of facilitating the transmission of data packets, or non-packetized data, into, out of, and through the switch 103. Such ports 106a-c may serve as interface points where network cables may be connected, connecting the switch 103 with other switches 103, and/or nodes 203.

Each port 106 may be capable of receiving incoming data packets from other devices and/or transmitting outgoing data packets to other devices. In some implementations, ports 106 may be configured to operate as either dedicated ingress or egress ports 106 or may be enabled to operate in a dual functionality capable of performing ingress and egress functions. For example, an egress port 106 may be used exclusively for sending data from the interconnect device and an ingress port 106 may be used solely for receiving incoming data into the switch.

Switching hardware 109 of a switch 103 may be capable of handling a received packet by determining a port 106 from which to send the packet and forwarding the packet from the determined port 106. Using a system or method as described herein, switching hardware 109 may be capable of adjusting an amount of bandwidth for possible routes for routing packets based on received congestion notifications. Switching hardware 109 may also be capable of generating congestion notifications for sending to other switches 103 in response to received packets based on congestion associated with various destinations and/or ports 106a-c as described herein.

Each port 106 of a switch 103 may be associated with one or more queues 121a-c. When a packet, or data in any format, is to be sent from a port 106, the packet may be stored in a queue 121 associated with the port 106 until the port 106 is ready to send the packet. When congestion occurs, a backlog of data in queues 121 may build. By monitoring an amount of data in each queue, as described herein, the switch 103 may be enabled to determine a congestion associated with each queue 121 and/or a congestion associated with the ports 106 associated with the queues 121.

Switching hardware 109 of a switch 103 may also include clock circuitry 130. Clock circuitry 130 may be used by switching hardware 109 and/or other components of the switch 103 to implement functions such as aging timers and congestion notification generation timers as described in greater detail below. In some implementations, clock circuitry may comprise a crystal oscillator or other circuit capable of providing an electrical signal at a particular frequency. Clock circuitry 130 may also or alternatively include one or more clock generators and other elements capable of providing counters and timers as described herein.

In support of the functionality of the switching hardware 109, processing circuitry 115 may be configured to control aspects of the switching hardware 109 to adaptive routing in relation to congestion notification. The processing circuitry 115 may in some implementations include a CPU, an ASIC, and/or other processing circuitry which may be capable of handling computations, decision-making, and management functions required for operation of the switch 103.

Processing circuitry 115 may be configured to handle management and control functions of the switch 103, such as setting up routing tables, configuring ports, and otherwise managing operation of the switch 103. Processing circuitry 115 may execute software and/or firmware to configure and manage the switch 103, such as an operating system and management tools. In some implementations, the processing circuitry 115 may be configured to receive congestion notifications and/or threshold settings from external devices such as other switches 103 and/or nodes 203. Processing circuitry 115 may be capable of adjusting table data 127 and/or threshold data 124, as described in greater detail below, and instructing switching hardware 109 to function in accordance with the table data 127 and threshold data 124.

Memory 118 of a switch 103 as described herein may comprise one or more memory elements capable of storing configuration settings, threshold data 124, table data 127, application data, operating system data, and other data. Such memory elements may include, for example, random access memory (RAM), dynamic RAM (DRAM), flash memory, non-volatile RAM (NVRAM), ternary content-addressable memory (TCAM), static RAM (SRAM), and/or memory elements of other formats.

Threshold data 124 as described herein may be values to which congestion amounts may be compared. For example, and as described in greater detail below, threshold data 124 may include an upper threshold and a lower threshold. Threshold data 124 may be written to a switch 103 by nodes 203 such as by users such as through the editing of configuration settings or may be programmed through an operating system of the switch 103.

Figures 3, 4:
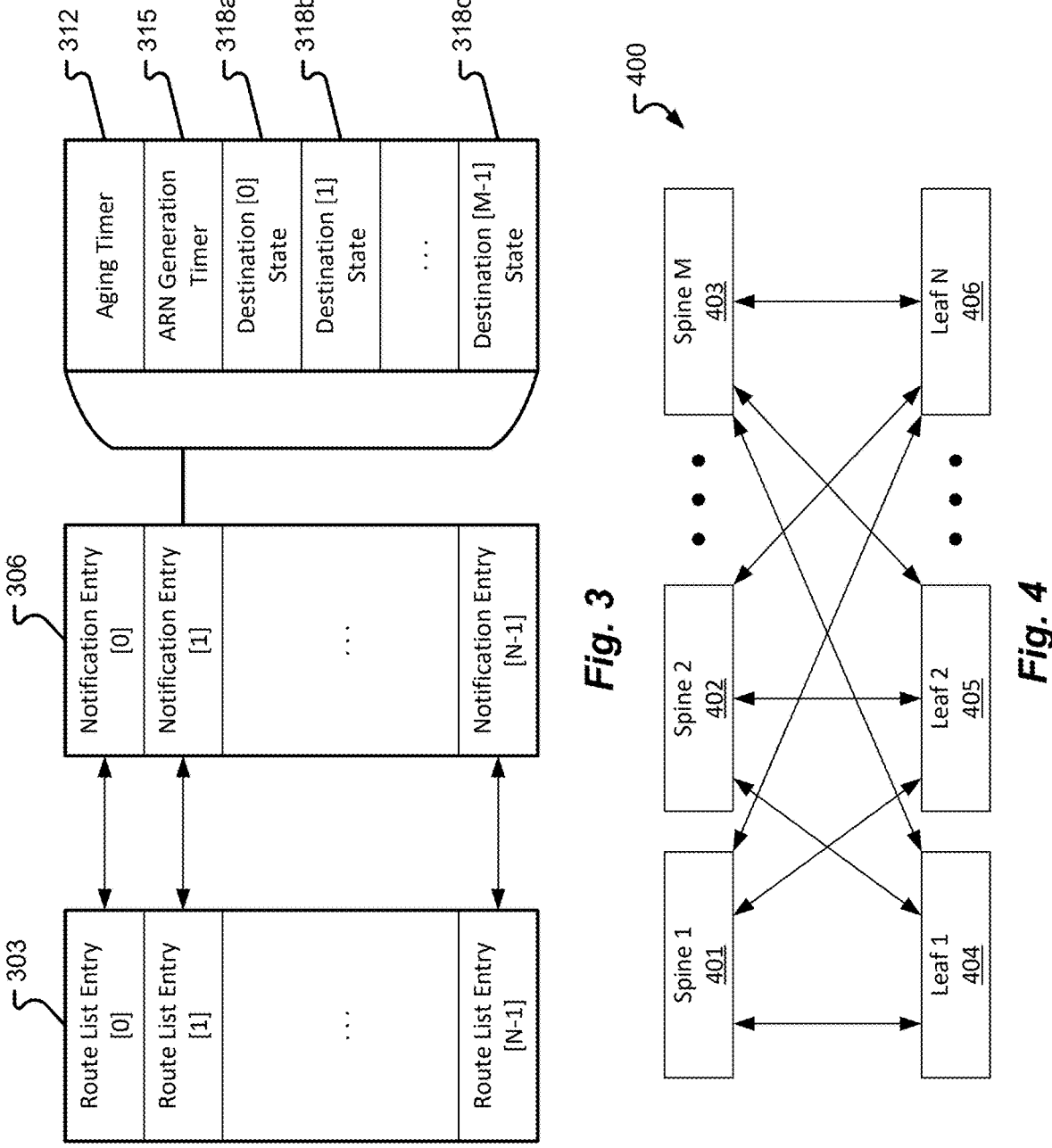
FIG. 3 illustrates table data in accordance with at least some embodiments of the present disclosure.
FIG. 4 illustrates a network of leaf switches and spine switches in accordance with at least some embodiments of the present disclosure.

Table data 127 may include a route list table 303 and a state table 306 as illustrated in FIG. 3 and described below. As a switch 103 operates, the switch 103 may receive and generate congestion notification and update the table data 127 based on received congestion notification as described below. Table data 127 may be used by switching hardware 109 to perform adaptive routing such as, when a packet is received, to determine from which port 106 the packet should be forwarded to reach the destination of the packet.

For example, as illustrated in FIG. 2, a number of switches 103a-f may be interconnected and also connected to nodes 203a-h to form a network. Each arrow in FIG. 2 may represent any number of one or more connections between the various elements. For example, ports of a first switch 103a may be connected to one or more ports of a second switch 103e, one or more ports of a third switch 103f, and one or more ports of each of nodes 203a and 203b. Each connection between a switch 103 and another switch 103 or node 203 may be used to carry multiple flows. Flows may also be static flows or adaptive routing flows. Static flows may be flows which cannot be rerouted via different routes through the network while adaptive routing flows may be flows which can be routed via a variety of different routes to reach the proper destination. As an example, each node 203a-h may transmit static flows and/or adaptive flows to other nodes 203a-h via the switches 103a-f.

As should be appreciated, the specific interconnections of the switches 103a-f and nodes 203a-h illustrated by FIG. 2 are provided for illustration purposes only and should not be considered as limiting in any way. While the network illustrated in FIG. 2 only includes 2 layers of switches 103, it should be appreciated additional layers may be introduced and switches may be interconnected in any conceivable manner. For example, in some implementations, a network as described herein may contain multiple switches 103 interconnected in a topology such as a Clos network or a fat tree topology network.

In a network of switches as described herein, remote congestion is a problem which may occur when data traverses the network. For example, in the network illustrated in FIG. 2, consider the scenario in which a first switch 103a and a second switch 103b are each sending large amounts of data to a third switch 103c via a spine switch 103e. The communication channels between the spine switch 103e and the third switch 103c may be operating at a high bandwidth and are experiencing congestion.

In the event that a fourth switch 103d receives a packet with a destination indicating node 203c or node 203f, the fourth switch 103d may determine the packet must be sent to the third switch 103c. However, in a conventional network, the fourth switch 103d, having not interacted with the spine switch 103e in some time, may be unaware of any congestion between the spine switch 103e and the third switch 103c. As a result, the fourth switch 103d may select the spine switch 103e for sending the packet to the third switch 103c. In this way, the fourth switch 103d may contribute to the congestion between the spine switch 103e and the third switch 103c. Meanwhile, the spine switch 103f may be operating in an underutilized manner.

This problem occurs particularly when one or more switches in a network either do not perform adaptive routing or are involved in sending static flows which cannot be rerouted. However, using the systems and methods described herein, switches 103 may be enabled to avoid remote congestion by rerouting data in an adaptive manner. The systems and methods disclosed herein provide a mechanism in which a congestion notification, which may be referred to as a remote congestion notification, is sent from one switch to other switches in the network, such that a better routing decision can be made by switches receiving the congestion notification. In this way, as described herein, the congestion notification may serve as a feedback loop by indicating whether the switch receiving the congestion notification should increase or decrease traffic towards a specific route in the network.

As an example, consider a scenario in the network of switches 103a-f illustrated in FIG. 2 in which congestion is occurring on the communication link from switch 103e to switch 103b. If switch 103e receives data directed to a node 203a, 203b, 203e-h which requires communicating via one of switches 103a, 103c, or 103d, such data will not contribute to the congestion. But if switch 103e receives data directed to a node 203b-203d which requires communicating via switch 103b, such data will contribute to the congestion. In the event that the switch 103e receives a packet directed to a node 203b-203d, or otherwise requires communicating via the congested link with switch 103b, the switch 103e will, through a method as described herein, respond with congestion notification towards the source instructing each switch 103 that receives the congestion notification to re-route traffic.

As described above, in adaptive routing there may be multiple paths between a source and a destination, along each path a packet is transferred between one or more switches, a switch (e.g., switch 1) is between another switch (e.g., switch 2) and the source when a packet is transferred from switch 2 to the switch 1 on a path towards the source. For example, in FIG. 2, between node 203a (e.g., a source) and node 203e (e.g., a destination), on one path are switches 103a, 103c, and 103c. On another path between node 203a and node 203e are switches 103a, 103f, and 103c. In other words, any of the switches 102a, 103e, 103f, and 103c are between the node 203a and the node 203e. Additionally, switches 103e, 103f, and 103a are between switch 103c and the node 203a.

Such a method may be enabled through the maintaining of tables of data as illustrated in FIG. 3. The data illustrated in FIG. 3 may be stored as table data 127 in memory 118 of a switch. A route list table 303 and a state table 306 as illustrated in FIG. 3 may contain data which may be used by a switch 103 to perform routing of packets.

A route list table 303 may list all possible routes for forwarding a packet. Each entry in the route list table may be associated with a different destination switch, or a switch on the same level as the switch maintaining the route list table 303. For example, if the switch maintaining the route list table 303 is a leaf switch, each of the other leaf switches in the network may be represented as an entry in the table. The route list table 303 in FIG. 3 includes one entry for each destination, or leaf switch, where the network includes N destinations. Such a network 400 is illustrated in FIG. 4.

It should be appreciated that in some implementations, entries in the route list table 303 may be associated with switches and/or other types of computing devices at any level of the network, such as final destination nodes, leaf switches, or other destinations. In some implementations, a route list table 303 may include an entry for each port of a switch.

The route list table 303 may store information about all possible routes for routing packets traversing the switch. The route list table 303 may be used by an adaptive routing mechanism to forward packets. Each switch in a network may store a respective routing table with an entry for each destination switch which will contain all the possible routes towards that destination.

A state table 306 may include data which may be updated in response to ARN packets received from other switches. Each entry in the state table 306 may be associated with a respective entry in the route list table 303. Like the route list table 303 in FIG. 3, the state table 306 may include one entry for each destination, where the network includes N destinations.

Each entry in the state table 306 may include or be associated with a secondary table including an aging timer 312, a congestion notification generation timer 315, and a destination state 318a-c for each upper layer switch, such as spine switches, ToR switches, or other switches to which the switch holding the state table 306 in memory may send a packet when forwarding the packet.

In the example illustrated in FIG. 3, notification entry [1] includes M destination states 318. As illustrated in FIG. 4, the network 400 includes M spine switches 401, 402, 403 and N leaf switches 404, 405, 406.

Each destination state 318a-c of the state table 306 may indicate a bandwidth for a respective destination of the plurality of destinations. The bandwidth may be an integer and may indicate a bandwidth in terms of percentage or bits per second for example which should be sent towards the destination.

In some implementations, each destination state 318a-c of the table may be associated with a maximum bandwidth and a minimum bandwidth. For example, a minimum bandwidth may be zero bits per second while a maximum bandwidth may be a maximum capability of the switch.

Each entry in the state table 306 may be associated with an aging timer 312. The aging timer 312 may be used to effectively reduce the effect of a received congestion notification over time by linearly or exponentially reducing values written in each destination state 318a-c of the state table 306. As a result, by using the aging timer 312, the switch will forget congestion information if no congestion notification is received for a particular amount of time.

In some implementations, the lowest level switches in a network, such as the leaf switches 404, 405, 406 in the network 400 of FIG. 4 may not generate congestion notifications and as a result may not use a congestion notification generation timer 315.

To illustrate the tables 303, 306 of FIG. 3, consider the network 400 of FIG. 4. Each leaf switch 404, 405, 406 may store a route list table 303 with an entry for each of the other leaf switches 404, 405, 406 and a state table 306 with an entry for each of the other leaf switches 404, 405, 406. For example, leaf 1 404 may store a route list table 303 with N–1 entries and a state table 306 with N–1 entries. Each entry in the state table 306 of leaf 1 404 may include M destination states 318.

Figure 5:
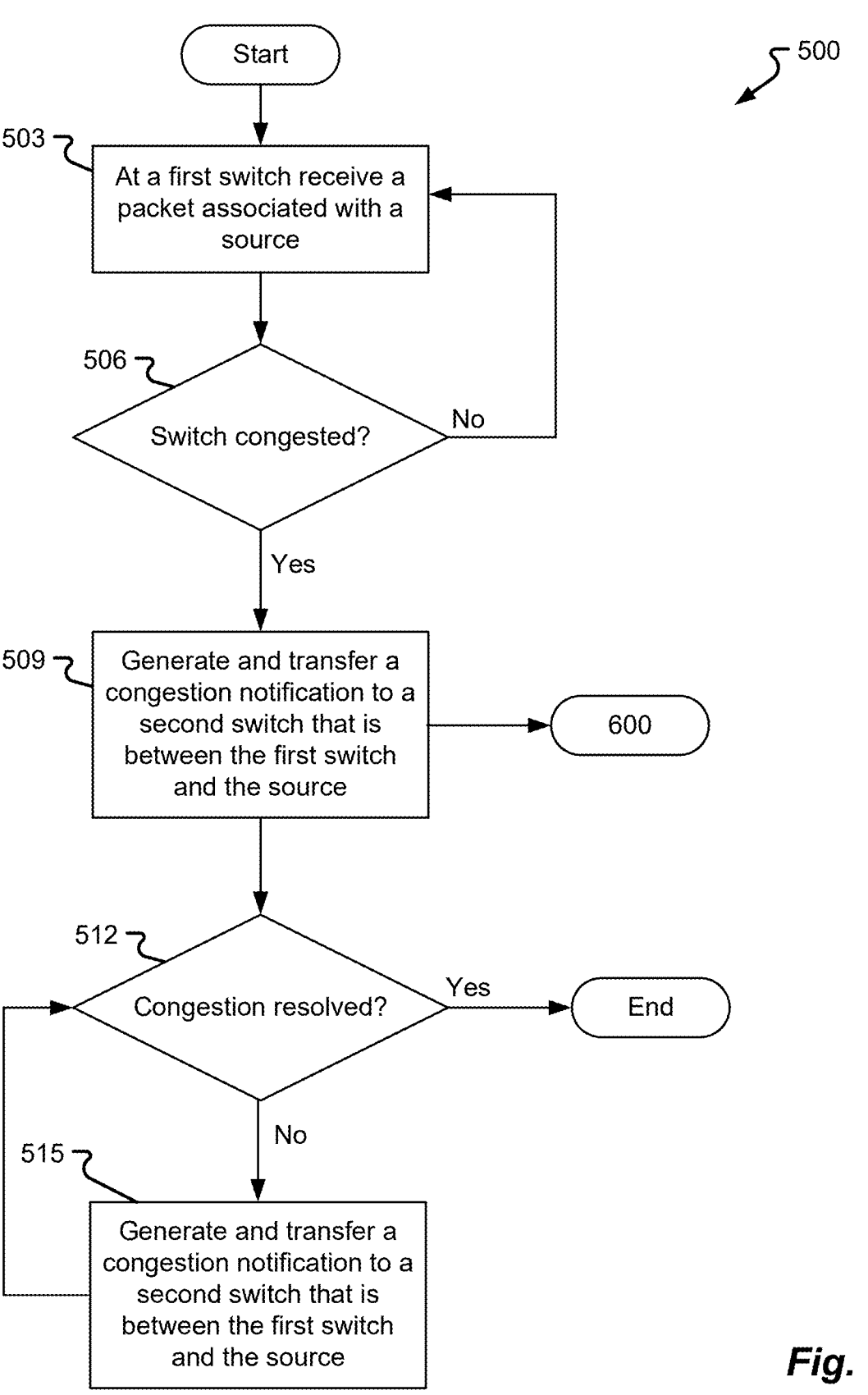
FIGS. 5 and 6 are flow diagrams depicting methods in accordance with at least some embodiments of the present disclosure.
Figure 6:
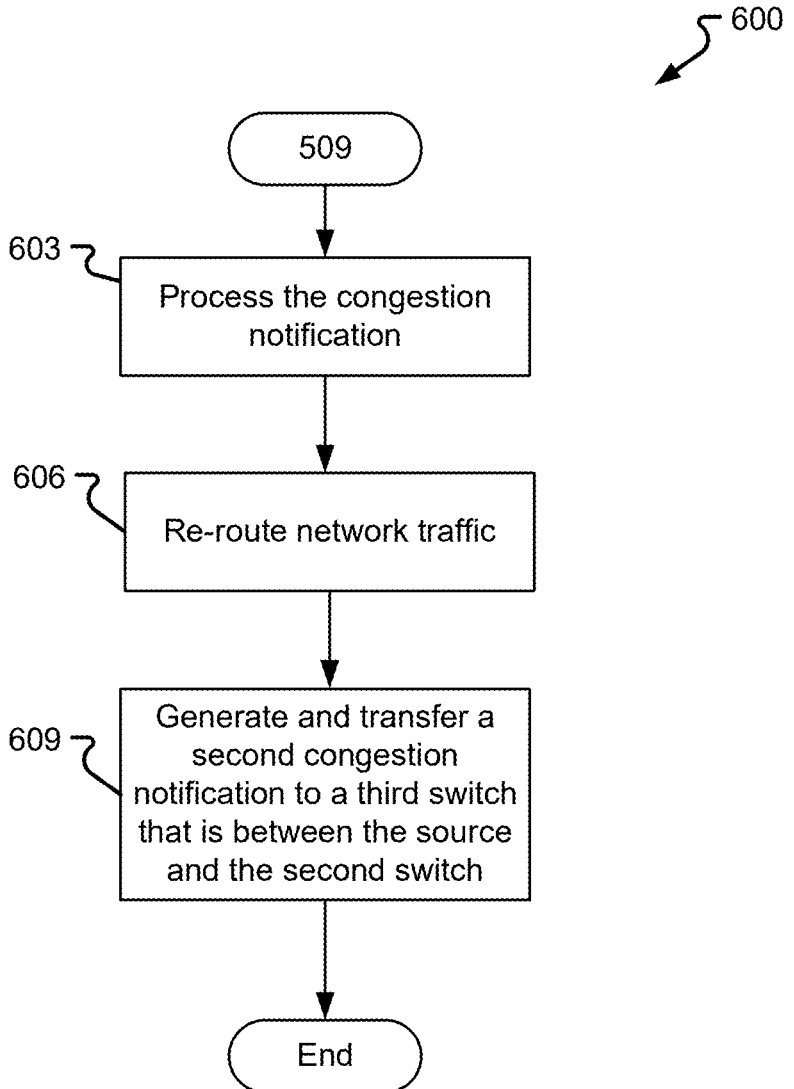

As illustrated in FIG. 5, a switch 103 may perform a method 500 of generating and transferring congestion notification (e.g., Adaptive Routing Notification packets) in response to congestion. The method 500 may begin at step 503 when the switch 103 receives a packet. The packet received by the switch 103 may be received from a particular source and/or via a particular port 106 of the switch 103. In some implementations, the switch 103 may be enabled to determine the source of the packet, for example by examining a header of the packet and performing a MAC address table lookup.

At step 506 the switch 103 determines if it is congested. If the switch is not congested (No), the method 500 continues to receive another packet at step 503. If the switch 103 is congested (Yes), at step 509, the switch 103 generates and transfers a congestion notification to a second switch 103 that is between the switch 103 and the source. For example, the switch 103e receives a packet from the switch 103a, and the source of the packet is node 203b. When the switch 103e receives the packet, it causes the switch 103e to become congested. In response to the switch 103e becoming congested, the switch 103e generates and transfers congestion notification to be sent towards the source (e.g., node 203b). From switch 103e towards node 203b, the congestion notification can be sent to either or both of 103a and 103b. In some embodiments, the packet received at 503 causes the switch 103 to become congested. In other embodiments, the switch 103 may be congested prior to receiving the packet at 503.

Determining a congestion associated with the switch 103 may involve determining a queue latency or a queue occupancy for a queue 121a-c associated with the port 106a-c from which the packet is to be sent from the switch 103. A queue latency as used herein may refer to an amount of time data (e.g., packets) spends in a queue 121 before being transmitted from a switch 103. A high queue latency may suggest that the outgoing link is currently congested and/or unable to handle additional traffic. For example, queue latency for a queue 121a associated with the port 106a may refer to an amount of time data spends in the queue 121a before being transmitted from the switch 103. Queue occupancy as used herein may refer to an amount of data (e.g., a number of packets or a number of bytes) in a queue 121 waiting to be sent from a switch 103. A high queue occupancy may suggest that the outgoing link is currently congested and/or unable to handle additional traffic. For example, a queue occupancy for a queue 121a associated with the port 106a may refer to an amount of data waiting in the queue 121a to be sent from the switch 103. In some implementations, a switch 103 may measure congestion level towards each the destination using a combination of queue latency and queue occupancy. In some implementations, the switch 103 may be enabled to convert one or both of the queue latency and queue occupancy into a number which can be compared to one or more thresholds. The switch 103 may compare the congestion, for example based on the queue latency and/or occupancy, to a range consisting of an upper threshold and a lower threshold.

At step 512 the switch 103 determines whether the congestion has been resolved. If the congestion has been resolved (Yes), then the method 500 ends. If the congestion has not been resolved (No), at 515 the switch 103 generates another congestion notification to a second switch 103 that is between the switch 103 and the source node 203b. Continuing the example above, the first congestion notification generated at step 509 is sent to 103b, however, in this example, the relevant switch that can resolve the congestion is the switch 103a, therefore, since the congestion notification generated at step 509 is sent to 103b and not 103a, the congestion is not resolved. The step 515 is repeated until the congestion is resolved. In embodiments, the switch 103 may set a timer (e.g., ARN generation timers 315) when the first congestion notification is sent, and re-send the congestion notification if the congestion is not resolved at the end of the timer. The method 500 is repeated by each switch 103 that consumes a congestion notification packet, and at step 509 the method 500 branches off to start method 600 in FIG. 6.

At step 603 the second switch 103 process the congestion notification for the switch 103. For example, either of both of the switches 103a/103b processes the congestion notification from the switch 103c. At step 606, the switch 103a/103b re-routes traffic based on the congestion notification. For example, using adaptive routing, the switch 103a/103b may re-route traffic that would have been sent to 103e. At step 609, the second switch generates and transfers a congestion message to a next switch between the second switch and the source node 203, except for the leaf switches connected to a node 203a-h do not generate and transfer a congestion notification.

In embodiments, the methods 500 and 600 may be stored as congestion management instructions 129 in memory 118 of a switch.

It is to be appreciated that any feature described herein can be claimed in combination with any other feature(s) as described herein, regardless of whether the features come from the same described embodiment.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system comprising one or more circuits to:

identify congestion at a first switch which received a packet from a source;

in response to determining the congestion exists at the first switch, generate a first congestion notification;

send the first congestion notification from the first switch to a second switch, wherein the second switch is between the first switch and the source;

set a timer based on an amount of time estimated for the congestion at the first switch to be resolved by the second switch or one or more other switches between the second switch and the source; and in response to the congestion at the first switch not being resolved when the timer ends, generate and send a second congestion notification from the first switch to a third switch.

2. The system of claim 1,
wherein the third switch is between the second switch and the source.

3. The system of claim 1, wherein the first switch comprises the one or more circuits.

4. The system of claim 1, wherein the third switch is directly connected to the source.

5. The system of claim 1, wherein the congestion is identified in response to determining an associated bandwidth of at least one port in the first switch is below a threshold.

6. The system of claim 1, wherein the congestion in the first switch is identified based on one or more of a queue latency and a queue occupancy.

7. The system of claim 1, further comprising:
the first, second, and third switches.

8. The system of claim 1, wherein the first congestion notification comprises an Adaptive Routing Notification (ARN).

9. A device comprising one or more circuits to:
receive a first congestion notification from a second device, wherein the first congestion notification is addressed to a source node and indicates congestion, and wherein the device is between the second device and the source node;
process the first congestion notification to determine whether the device is able to resolve the congestion;
generate and send a second congestion notification to a third device when the device is unable to resolve the congestion, wherein the second congestion notification is addressed to the source node, and wherein the third device is between the second device and the source node; and
cause, when the device is able to resolve the congestion, the device to reroute traffic associated with the congestion.

10. The device of claim 9, wherein the device, the second device, and the third device correspond to switches.

11. The device of claim 9, wherein the first congestion notification is generated in response to determining a bandwidth of at least one port is below a threshold.

12. The device of claim 9, wherein the congestion is determined based on one or more of a queue latency and a queue occupancy.

13. The device of claim 9, wherein re-routing the traffic comprises using adaptive routing to re-route the traffic.

14. The device of claim 9, wherein the first congestion notification comprises an Adaptive Routing Notification (ARN).

15. A network comprising:
a first device comprising one or more circuits to:
receive a first congestion notification from a second device, wherein the first congestion notification is addressed to a source node and indicates congestion, and wherein the first device is between the second device and the source node;
process the first congestion notification to determine whether the first device is able to resolve the congestion;
generate and send a second congestion notification; to a third device when the first device is unable to resolve the congestion, wherein the second congestion notification is addressed to the source node, and wherein the third device is between the first device and the source node; and
cause, when the first device is able to resolve the congestion, the first device to reroute traffic associated with the congestion.

16. The network of claim 15, wherein the first device, the second device, and the third device correspond to switches.

17. The network of claim 15, wherein the first congestion notification is generated in response to determining a bandwidth of at least one port is below a threshold.

18. The network of claim 15, wherein the congestion is determined based on one or more of a queue latency and a queue occupancy.

19. The network of claim 15, wherein re-routing the traffic comprises using adaptive routing to re-route the traffic.

20. The network of claim 15, wherein the first congestion notification comprises an Adaptive Routing Notification (ARN).

* * * * *